UNITED STATES PATENT OFFICE.

JOHANN KARL KESSLER, OF MILWAUKEE, WISCONSIN, ASSIGNOR OF ONE-HALF TO MORRIS ROTH, OF SAME PLACE.

PROCESS OF OBTAINING AND PURIFYING GLYCERINE FROM SOAP-BOILERS' MOTHER-LYE.

SPECIFICATION forming part of Letters Patent No. 263,915, dated September 5, 1882.

Application filed June 20, 1882. (No specimens.)

*To all whom it may concern:*

Be it known that I, JOHANN KARL KESSLER, of Milwaukee, in the county of Milwaukee, and in the State of Wisconsin, have invented certain new and useful Improvements in the Process of Obtaining and Purifying Glycerine from Soap-Boilers' Mother-Lye; and I do hereby declare that the following is a full, clear, and exact description thereof.

My process consists in the addition of certain specified substances to the material to be treated at certain times and in specified order, whereby the raw glycerine is freed from its organic impurities and from its salts, all as will be more fully set forth hereinafter.

In the various methods hitherto proposed or employed for obtaining pure glycerine from soap-boilers' mother-lye the presence of foreign ingredients—such as common and other salts, organic coloring-matter, &c.—have presented such obstacles in the way of purification of the raw glycerine that in most cases no product of any commercial value could be obtained, or, when it was, the distillation of it was rendered almost or quite impossible, and was always a matter of much difficulty, accomplished only at the expense of a great deal of time, whereas by my process the raw glycerine resulting from the concentration of the mother-lye may be thoroughly cleansed, quickly and easily, and the subsequent distillation (whenever an absolutely pure product is required) can be performed without difficulty. For ordinary purposes the glycerine, when the lye is treated by my process, will be found sufficiently pure without distillation.

Before applying my particular process hereinafter set forth, I would recommend that the mother-lye be first neutralized by means of sulphuric or muriatic acid, as heretofore practiced. The addition of a little alum will also be found very beneficial in preparing the material for the succeeding steps. The whole mass should be well stirred and then allowed to settle for a few hours. The acidulous reaction produced by the addition of the alum can readily be done away with by adding a small quantity of Spanish white. Thereupon the liquid thus prepared, after being drawn off from the sediment or filtered, if necessary, ought to be boiled down in order to remove the greater part of the salts which it contains. For boiling, I prefer a temperature of about 130° Celsius. The salts thereby become crystallized. When the liquid is sufficiently evaporated it is allowed to cool off. It then becomes of the consistency of sirup; and after decanting it from the crystallized salts, which are found deposited on the bottom of the pan, it is then diluted with water. So far the treatment presents no especial points of novelty.

What I regard as new and of my invention is the described subsequent treatment, as follows: To the diluted mass of raw glycerine above described I add a solution of the acetate of the oxide of lead, in order to free the liquid from its coloring-matter and other impurities, as well as of the remaining particles of salt. By such addition chloride of lead and acetate of soda are formed. The former substance can be easily separated by decanting or filtration, as it presents itself in the form of a sediment, which is of an almost insoluble character. The solution is now of a bright-yellow color, and consists of glycerine containing acetate of soda in a dissolved state, together with any excess of the acetate of the oxide of lead added for purposes aforesaid. To this solution is now added a solution of oxalic acid, whereby oxalate of the oxide of lead and oxalate of soda are formed. Both of these are hardly soluble, and appear in the form of heavy sediments, admitting readily of filtering and separation. The liquid thus freed from these substances is glycerine, still corrupted by the presence of acetic acid and oxalic acid. The glycerine solution is then heated to from 80° to 100° Celsius for a considerable time—say twelve hours, more or less—whereby the oxalic acid is transformed into formic acid. If previous to the addition of the oxalic acid any traces of chloride of lead should still appear in the liquid, a trifling quantity of muriatic acid may have formed; but if now high-pressure steam is conducted through the heated glycerine solution, all acids (acetic, formic, and muriatic) will be eliminated in the form of vapor, and glycerine of sufficient purity for use in the mechanical arts will remain. In case the presence of a slight quantity of oxalic acid still be discoverable, it can also be readily removed after the acetic, formic, and muriatic acids are completely eliminated by the addition of chalk, the latter forming, with the oxalic acid, insoluble oxalate of lime, which becomes separated by precipitation.

The material and essential features of my process consist in the use of acetate of the oxide of lead and oxalic acid, by means of which two substances added in the manner and order described, together with the subsequent treatment by heating, steaming, &c., as described, the raw glycerine is freed from its organic impurities and salts sufficiently to fit it for ordinary use.

I believe I am justly entitled to protection for my described method. All previous methods, so far as known to me, have yielded results so unsatisfactory that the attempted production of glycerine out of soap-boilers' mother-lye has been abandoned; but by my process this can be readily, cheaply, and easily accomplished, and the enormous quantities of soap-boilers' lye which are annually produced and otherwise worthless can be thus utilized. In case an absolutely pure product is required, (as for medical or other use,) the glycerine obtained by my process should be further purified by distillation; but, as stated, for ordinary use in the mechanical arts this is unnecessary.

In the foregoing description weights and measures of quantities of the various materials and ingredients have not been given for several reasons. First, I do wish to limit myself in that way, nor so restrict my invention, and thus impair its scope and usefulness; secondly, the nature or constituent parts of the mother-lye will differ in each individual case, and hence no exact nor even reasonably approximate proportions can well be given; thirdly, as the specification is addressed to those skilled in the art, proportions are believed to be unnecessary, as any chemist will know when one material becomes neutralized by the addition of another, irrespective of exact measures, or when the salts have crystallized, and so on, in each individual case.

Having thus described my invention, what I claim as new, and desire to secure by Letters Patent, is—

1. In the process of purifying glycerine obtained from soap-boilers' mother-lye, the method described, consisting of the addition of a solution of acetate of the oxide of lead to the diluted raw glycerine, followed by the addition of a solution of oxalic acid, and subjecting the mass to decanting or filtration, heat, and high-pressure steam, in the order and manner described.

2. The process of purifying diluted raw glycerine obtained from soap-boilers' mother-lye, consisting in adding a solution of the acetate of the oxide of lead, forming insoluble chloride of lead and soluble acetate of soda, separating the former substance by decanting or filtration, adding to the remaining solution a solution of oxalic acid, forming a solution containing insoluble oxalate of the oxide of lead and insoluble oxalate of soda, separating the glycerine mass now corrupted by acetic and oxalic acids, &c., from these substances by filtration, and then heating it to transform its acetic acid into formic acid, and next removing all remaining acids in the form of vapor by conducting high-pressure steam through the mass, as set forth.

3. In the process of obtaining glycerine from soap-boilers' mother-lye, the method described of neutralizing the lye with sulphuric or muriatic acid, (and adding alum and Spanish white, if desired,) decanting the liquid and crystallizing its salts by boiling, again decanting the liquid and diluting it with water, adding a solution of the acetate of the oxide of lead, forming insoluble chloride of lead and soluble acetate of soda, decanting the solution remaining and adding thereto a solution of oxalic acid, decanting this resulting solution from the insoluble substances formed by the mixture and heating it from 80° to 100° Celsius, and then conducting high-pressure steam through the mass to remove all acids in the form of vapor, leaving purified glycerine as the result, substantially as set forth.

In testimony that I claim the foregoing I have hereunto set my hand on this 13th day of June, 1882, in the presence of two witnesses.

JOHANN KARL KESSLER.

Witnesses:
HAROLD G. UNDERWOOD,
MORRIS ROTH.